UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

BORATED FERTILIZER.

943,668.  Specification of Letters Patent.   Patented Dec. 21, 1909.

No Drawing.   Application filed March 26, 1909. Serial No. 486,049.

*To all whom it may concern:*

Be it known that I, CARLETON ELLIS, citizen of the United States, residing at Larchmont, in the county of Westchester and State of New York, have invented certain new and useful Improvements in Borated Fertilizers, of which the following is a specification.

This invention relates to fertilizers and relates particularly to fertilizers containing lime-borax waste material from the manufacture of borax. This material has desirable fertilizing properties and in addition has a neutralizing action on acid soils which make it especially desirable as an ingredient of fertilizers. It also has certain antiseptic qualities which render its application particularly advantageous in soils where bacteria and fungi of various sorts have secured a foothold. It possesses however the disadvantage of exerting an inhibiting action on nitrifying bacteria which are so essential to the conversion of nitrogenous matter into nitrates and nitrites. In order that nitrogen may be readily taken up by vegetation, it is necessary that this nitrogen be in the form of a nitrate or nitrite, and in the use of tankage or similar organic bodies or of ammonium salts such as ammonium sulfate or chlorid, oxidation must take place through the agency of nitrifying bacteria in order to produce nitrate or nitrite. The inhibiting action of the lime-borax waste on nitrifying bacteria makes its use in the untreated form undesirable. I have found that such waste material may be rendered inert to nitrifying bacteria by the addition of a neutralizing body preferably a basic compound of lime, such as saccharate of lime or ordinary quick-lime. The action in this case apparently is to form a sort of borate which while having sterilizing and antiseptic action, and which is selective so far as ordinary bacteria and fungi are concerned, is without influence on nitrifying bacteria, and in fact, under certain circumstances, may accelerate their action. As most borax salts are soluble, it is not possible to add a material which will precipitate and render insoluble the borax constituent nor indeed would it be desirable in view of the sterilizing action of the latter, provided the action of nitrifying bacteria is not hindered. The neutralizing action of the lime compound referred to is such that the lime-borax waste may be used in rather large proportions without disadvantage.

The sludges of wastes obtained in the manufacture of borax are usually composed to a large extent either of sulfate or carbonate of lime. A typical analysis of the former is as follows:—

| | |
|---|---|
| Lime | 37.28% |
| Sulfuric acid anhydrous | 51.40% |
| Silica | 4.48% |
| Alumina and iron oxid | 1.59% |
| Anhydrous boric acid | 2.10% |
| Magnesia | .24% |
| Water | 2.91% | and of the latter—

| | |
|---|---|
| Silica | 8.67% |
| Alumina | 1.81% |
| Oxid of iron | .35% |
| Lime | 45.84% |
| Magnesia | 2.75% |
| Anhydrous boric acid | 2.36% |
| Carbonate acid (anhydrous) | 33.85% |
| Sodium oxid | 1.16% |
| Water | 2.02% |

Small amounts of chlorids and sulfates.

The above analyses are based on the dry material but it should be understood that the sludge as obtained from the treating tanks is moist, ordinarily carrying from 25% to 50% of water.

It is probable also that the treated lime-borax waste exerts an influence on the action of toxic materials which accumulate in the soil, such for example, as dihydroxystearic acid and picolin dicarboxylic acid, rendering such bodies either inert or less toxic in action.

In order to convert the borax waste into a useful form, I may treat it in the moist condition (containing 25% to 50% of water) with ground quick-lime, which apparently forms the basic borate referred to and at the same time desiccates the borax waste, producing either a dry powder or a material which may be readily dried with the expenditure of but little fuel. Ordinarily for this purpose, I add from 5% to 10% of quick-lime to the damp waste material with agitation and heating. If calcium saccharate is used, I employ from 2% to 3% ordinarily.

A suitable formula illustrative of my invention consists of treated waste lime-borax material 35 parts, Chile saltpeter 25 parts, sulfate of potash 25 parts, precipitated phosphate of lime 20 parts. Another formula consists of treated waste line-borax material 25 parts, tankage 25 parts, ground potassium chlorid 20 parts, superphosphate of lime 35 parts.

With the above may be incorporated other fertilizing or extending materials, such as ammonium sulfate, ammonium nitrate, kainite, carnallite, glauconite, and ground feldspar. Humus especially in the form of dried granular peat may be added to advantage. In some cases, double superphosphate of lime may be used to partly replace the superphosphate or other phosphate material.

Having described my invention to the details of which description I do not wish to limit myself, what I claim is:—

1. As a fertilizer the herein described waste material derived from the production of borax, and an alkaline compound; whereby its boric acid content is rendered non-toxic to vegetation.

2. A fertilizer containing the herein described waste material derived from the production of borax, an alkaline compound; whereby its boric acid content is rendered non-toxic to vegetation and soluble fertilizing salts.

3. A fertilizer consisting of the herein described waste material derived from the production of borax, a lime compound; whereby its boric acid content is rendered harmless to vegetation and soluble fertilizing salts including compounds of potash, ammonia and phosphoric acid.

4. A fertilizer comprising lime, the herein described waste material derived from the production of borax and soluble fertilizing salts.

In testimony whereof I have affixed my signature in presence of two witnesses.

CARLETON ELLIS.

Witnesses:
NATHANIEL L. FOSTER,
FRANCES I. NEWMAN.